United States Patent [19]
Bensch, Walter D.

[11] Patent Number: 4,660,880
[45] Date of Patent: Apr. 28, 1987

[54] UNDERHOOD TOOL BOX

[76] Inventor: Bensch, Walter D., 5050 Lindale Dr., Wichita Falls, Tex. 76310

[21] Appl. No.: 809,236

[22] Filed: Dec. 16, 1985

[51] Int. Cl.$^4$ .............................................. B62D 33/04
[52] U.S. Cl. ................................................. 296/37.1
[58] Field of Search ............................. 296/37.1, 37.6; 224/42.42 R

[56] References Cited

U.S. PATENT DOCUMENTS

| | | | |
|---|---|---|---|
| 1,490,657 | 4/1924 | Botella | 224/42.42 R |
| 3,231,292 | 1/1966 | Lorenz | 296/37.1 |
| 3,664,704 | 5/1972 | Ellis | 296/37.6 |
| 3,727,971 | 4/1973 | Sisler | 296/37.6 |
| 4,190,281 | 2/1980 | Chandler | 296/37.6 |

Primary Examiner—Robert R. Song
Attorney, Agent, or Firm—Hubbard, Thurman, Turner & Tucker

[57] ABSTRACT

This invention relates to a storage device for tools and the like, which is mounted adjacent the interior side of a front quarter panel and over the curved surface of a fender well.

9 Claims, 4 Drawing Figures

UNDERHOOD TOOL BOX

BACKGROUND OF THE INVENTION

1. Field of the Invention

The present invention pertains to a storage device for tools and the like comprising a rigid container particularly adapted to be mounted within the engine compartment of an automobile.

2. Background

Various automobile tool storage devices are known in the art. For example, many tool storage containers are found which are easily transportable from one location to another permitting ready accessibility for work in conjunction with an automobile. Containers of this type include large tool cabinets mounted on rollers for mobility in perhaps a mechanic's garage, as well as compact tool kits which may be hand carried and easily placed within the passenger compartment or trunk of an automobile. Particularly advantageous are those types of containers which may be carried within the vehicle at all times, for unanticipated use during emergencies. The problem with these types of containers, however, is that they precariously occupy needles space within the limited confines of the vehicle, and often shift or overturn under normal driving conditions. Attempts have been made to provide a more convenient automobile tool storage device; for instance, those containers which fixedly mount within the rear portion of a pickup truck or trunk of an automobile. These devices nonetheless occupy space which may otherwise be available for use, and although contained within the vehicle are inconveniently situated for easy access during work on the engine.

One particularly advantageous, yet unrealized, type of tool storage device suited for use in conjunction with an automobile, is characterized by a rigid container particularly adapted to be mounted within the engine compartment of the automobile. This type of tool container is molded to mount over the fender well and occupy unused space under the hood of the car. This type of device must be manufactured at a reasonable cost in order to be a marketable item and at the same time be constructed to be durable and withstand exposure to heat and the elements. The tool box container must be functionally superior and easy to install. To this end certain improvements have been considered desirable yet unrecognized by those skilled in the art prior to the development of the present invention.

SUMMARY OF THE INVENTION

Accordingly, the primary object of the present invention is to provide a tool storage apparatus which is adapted to mount within the engine compartment of an automobile, truck, or other vehicle.

Another object of the invention is to provide a tool storage apparatus configured to rest over the interior portion of an automobile front fender well for maximum utility of unused space within the confines of the automobile engine compartment.

Still another object of the invention is to provide a tool storage device mounted within the engine compartment of an automobile suficient in volume to contain commonly required tools for engine maintenance and repair.

Yet another object of the present invention is to provide a tool storage apparatus which occupies otherwise unused space within an automobile engine compartment supplying close proximity and easy access of tools to their source of use.

The foregoing objects are achieved in a tool storage apparatus which mounts within the engine compartment of an automobile over the fender well adjacent the interior side of a front quarter panel. The apparatus comprises front and rear panels, front and rear sidewalls, and a base which defines a storage bin. The base is arcuate in shape to conform to the contours of the fender well. The front and rear panels have arcuate lower margins to conform to the shape of said base. An access lid with an extended tip portion to prevent foreign matter from entering the storage bin is pivotally mounted along one edge of the rear panel to cover the storage bin. The apparatus includes a plurality of fastener brackets to permit the device to be securely mounted to a quarter panel, frame portion or the fender well of the automobile.

Preferred embodiments of the invention may include partition means within the interior of the storage bin to compartmentalize and organize the contents placed within the apparatus. The rear panel may include an extended horizontal ridge to provide support for said apparatus along the fender well or quarter panel. The dimensions of the apparatus are preferably suited to provide a deep interior at one end to conform to a standard fender well and increase the availability of storage space. The dimensions may be varied for adaption to specific types of vehicles.

DESCRIPTION OF THE PREFERRED EMBODIMENTS

Figure 1:
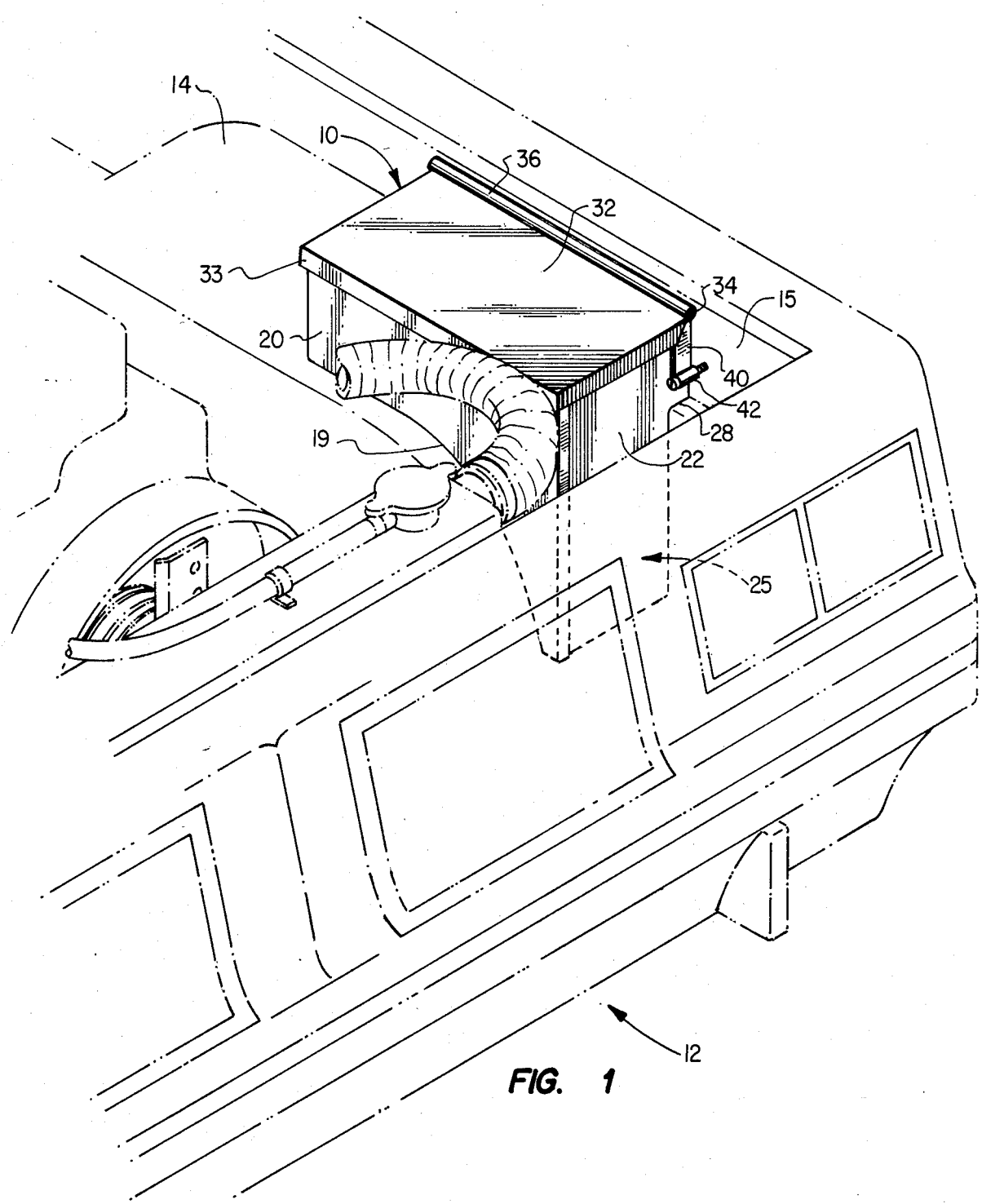
FIG. 1 is a front perspective view, partially broken away, of the tool storage apparatus of the present invention.

With reference now to the figures and in particular with reference to FIG. 1, there is depicted a perspective view of tool storage apparatus 10 of the present invention. Tool storage apparatus 10 is adapted to be mounted within the engine compartment of automobile 12 directly over fender well 14 and adjacent front quarter panel 15 and may be constucted, in a preferred embodiment, of metal, plastic, fiberglass, or any other material of suitable rigidity and thermal properties. Although automobile 12 is depicted in FIG. 1, it is clear the apparatus may be used in conjunction with perhaps a truck or other vehicle.

Storage bin 16 (see FIGS. 2-4) of the tool storage apparatus 10 is defined by rear panel 18, front panel 20, front sidewall 22, rear sidewall 24, and base 26. Rear panel 18 is molded to form a horizontal ridge 28 suitable to conform to most interior fender, quarter panel and frame configurations within the engine compartment of auto 12 thereby providing for more stable mounting of the apparatus 10 over fender well 14. Front sidewall 22 is orthogonally disposed with reference to rear panel 18 and secured thereto along one edge of rear panel 18 by rivets, welding, or by other means apparent to those skilled in the art. Rear sidewall 24 is positioned parallel to front sidewall 22 and is secured along the opposite edge of rear panel 18 by similar means. Front panel 20 is secured to each corresponding edge of front sidewall 22 and rear sidewall 24 parallel to rear panel 18 to form enclosed storage bin 16. Base 26 is arcuate in shape and forms the bottom of storage bin 16, being secured along the lower margins of front and rear panels 18 and 20 and front and rear sidewalls 22 and 24. The base, of course, may be modified in shape to conform to any vehicle fender well. The lower margins 19 of front panel 20 and rear panel 18 are arcuate to conform to the shape of base 26. The dimensions of storage bin 16 as herein defined provides for a deep well area 25 which maximizes storage space for tools and bulky items such as perhaps jumper cables. Those skilled in the art will appreciate that while each of the above mentioned panels may be secured by rivets, welding, or other fastening means, in an alternative embodiment tool storage apparatus 10 may be formed of plastic or other material and injection molded for unibody construction. The upper edges of each panel and sidewall may be curled to form rim 30. The rounded surface of rim 30 eliminates a somewhat unsafe sharp edge likely to result in minor cuts and abrasions in the arm of the user during harried and repetitive manual access to tools within storage bin 16.

Figure 2:
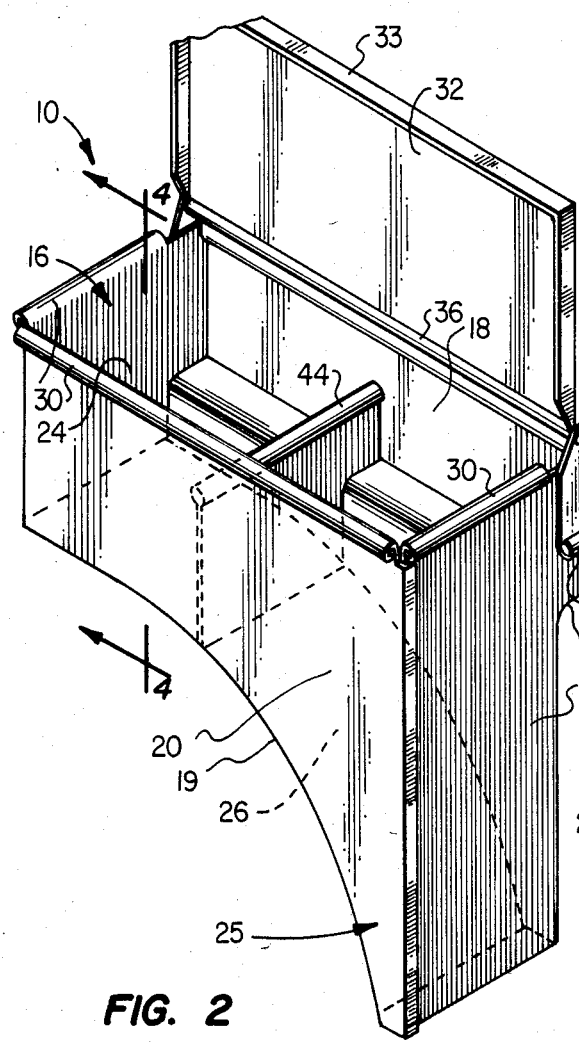
FIG. 2 is a front perspective view of the tool storage apparatus of the present invention.
Figure 3:
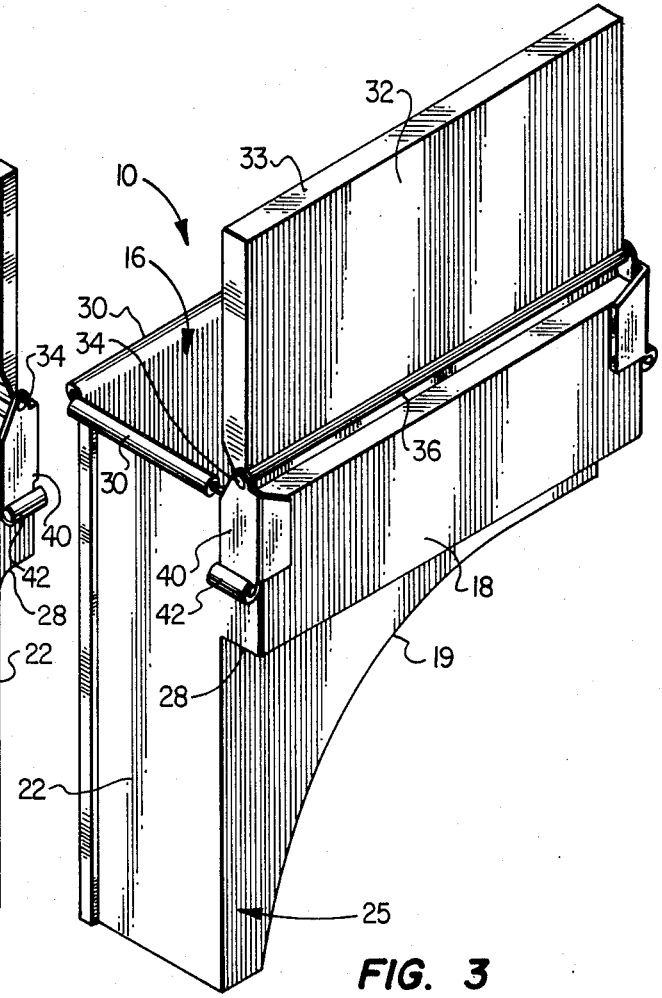
FIG. 3 is a rear perspective view of the tool storage apparatus of the present invention.
Figure 4:
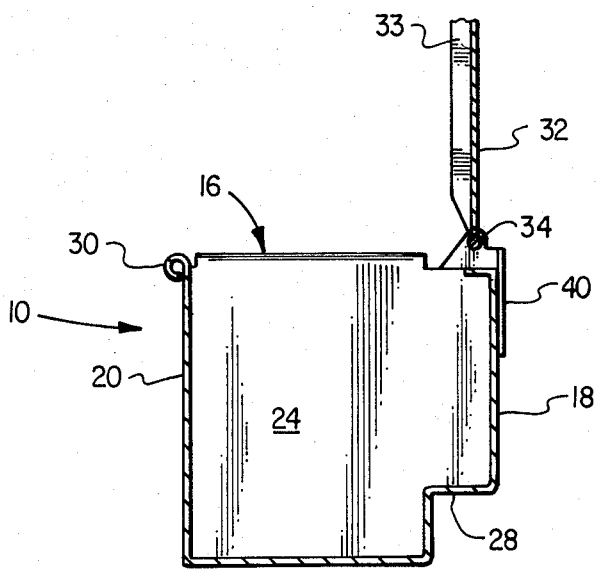
FIG. 4 is a horizontal sectional view of the apparatus of FIG. 2 taken substantially on lines 4—4 of FIG. 2.

With reference now to FIGS. 2, 3 and 4, access lid 32 axially rotates about hinge pin 34 to enclose storage bin 16, and in the open position permits manual access thereto. Hinge pin 34 is disposed along tunnel 36 of cover 32 and projects through opening 36 in fastener brackets 40. Brackets 40 are secured to apparatus 10 at the intersection of rear panel 18 with front and rear sidewalls 22 and 24 by rivets, heat pressing, welding, or other means known in the art and support hinge pin 34 to permit cover 32 to substantially cover storage pin 16. Brackets 40 further include mounting supports 42 to secure the tool storage apparatus 10 to automobile 12 at quarter panel 15 or at another location of the automobile frame by threaded fasteners, bolts, or other means. Access lid 32 includes an extended lip portion 33 which overlaps rim 30 when cover 32 is in the closed position thereby preventing moisture or the like from entering storage bin 16. In a preferred embodiment, the interior portion of tool storage apparatus 10 includes transverse divider 44 to compartmentalize storage bin 16 to enhance organization and ease of retrieval of tools. A plurality of removable dividers may be provided as recognized by those skilled in the art.

Although the invention has been described with reference to a specific embodiment, this description is not meant to be construed in a limiting sense. Various modifications of the disclosed embodiment, as well as alternative embodiments of the invention will become apparent to persons skilled in the art upon reference to the description of the invention. It is therefore contemplated that the appending claims will cover such modifications that fall within the true scope of the invention.

What is claimed is:

1. A tool apparatus for automobile engine compartment installation adjacent the interior side of a front quarter panel and over the curved surface of a fender well comprising:
    a base arcuately formed to fit contiguous with the curved surface of said fender well;
    a front panel and a rear panel each having an arcuate lower margin to conform to the shape of said base;
    a front sidewall;
    a rear sidewall;
    a storage bin defined by said base, said front panel, said rear panel, said front sidewall and said rear sidewall.

2. The apparatus according to claim 1 including:
    an access lid pivotally mounted along one edge of said rear panel for covering said storage bin.

3. The apparatus according to claim 2 wherein:
    said access lid includes an extended lip portion for preventing the entry of foreign matter into said storage bin.

4. The apparatus according to claim 1 including:
    a plurality of fastener brackets for fixedly mounting said apparatus to said quarter panel.

5. The apparatus according to claim 4 wherein:
    said fastener brackets include hinge means for pivotally securing said access lid over said storage bin.

6. The apparatus according to claim 1 including:
    a plurality of divider panels disposed within said storage bin for compartmentalization and organization of the contents therein.

7. The apparatus according to claim 1 including:
    a rim defined by an upper edge of said front panel, said rear sidewall and said front sidewall which is rounded to eliminate a sharp edge for protection of the user.

8. The apparatus according to claim 1 wherein:
    said rear panel includes a horizontal ridge for providing support of said apparatus along said fender well.

9. A tool storage apparatus for automobile engine compartment installation adjacent the interior side of a front quarter panel and over the curved surface of a fender well comprising:
    a base arcuately formed to fit contiguous with the curved surface of said fender well;
    a front panel and a rear panel each having an arcuate lower margin to conform to the shape of said base;
    a front sidewall;
    a rear sidewall;
    a storage bin defined by said base, said front panel, said rear panel, said front sidewall and said rear sidewall; and
    a plurality of fastener brackets for fixedly mounting said apparatus to said quarter panel.

* * * * *